United States Patent
Lee

(10) Patent No.: US 9,419,466 B2
(45) Date of Patent: Aug. 16, 2016

(54) BATTERY PACK, BATTERY APPARATUS INCLUDING THE SAME, AND CELL BALANCING METHOD THEREOF

(71) Applicant: SNU R&DB Foundation, Seoul (KR)

(72) Inventor: Jung Woo Lee, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 189 days.

(21) Appl. No.: 13/747,850

(22) Filed: Jan. 23, 2013

(65) Prior Publication Data

US 2014/0055096 A1 Feb. 27, 2014

(30) Foreign Application Priority Data

Aug. 24, 2012 (KR) .................. 10-2012-0093183

(51) Int. Cl.
| | |
|---|---|
| *H02J 7/00* | (2006.01) |
| *H02J 7/02* | (2016.01) |
| *H01M 10/46* | (2006.01) |
| *H01M 10/42* | (2006.01) |
| *H01M 10/48* | (2006.01) |
| *H02J 5/00* | (2016.01) |
| *B60L 3/12* | (2006.01) |
| *B60L 11/18* | (2006.01) |

(52) U.S. Cl.
CPC . *H02J 7/025* (2013.01); *B60L 3/12* (2013.01); *B60L 11/1861* (2013.01); *B60L 11/1866* (2013.01); *H01M 10/425* (2013.01); *H01M 10/46* (2013.01); *H01M 10/482* (2013.01); *H02J 5/005* (2013.01); *B60L 2210/30* (2013.01); *B60L 2210/40* (2013.01); *B60L 2240/547* (2013.01); *H01M 2010/4271* (2013.01); *H01M 2220/20* (2013.01); *Y02T 10/7005* (2013.01); *Y02T 10/7044* (2013.01); *Y02T 10/7061* (2013.01); *Y02T 10/7241* (2013.01)

(58) Field of Classification Search
USPC .................. 320/108, 134, 137, 158, 159, 162
See application file for complete search history.

(56) References Cited

U.S. PATENT DOCUMENTS

| | | | |
|---|---|---|---|
| 6,208,115 B1 * | 3/2001 | Binder .......................... | 320/108 |
| 8,692,515 B2 * | 4/2014 | Nakao .................. | H02J 7/0016 320/116 |
| 2008/0061735 A1 * | 3/2008 | Toya et al. ..................... | 320/108 |
| 2008/0112158 A1 * | 5/2008 | Ellis .............................. | 362/158 |
| 2008/0284375 A1 * | 11/2008 | Nagaoka et al. .............. | 320/116 |
| 2009/0267560 A1 * | 10/2009 | Toya et al. ..................... | 320/108 |
| 2010/0194334 A1 * | 8/2010 | Kirby et al. ................... | 320/108 |
| 2011/0084657 A1 * | 4/2011 | Toya et al. ..................... | 320/108 |
| 2011/0316475 A1 * | 12/2011 | Jung et al. ..................... | 320/108 |
| 2012/0032632 A1 * | 2/2012 | Soar .............................. | 320/108 |
| 2012/0059527 A1 * | 3/2012 | Beaston ............. | H01M 10/441 700/295 |
| 2012/0098486 A1 * | 4/2012 | Jung .............................. | 320/108 |
| 2012/0133335 A1 * | 5/2012 | Tanabe .......................... | 320/137 |
| 2012/0187851 A1 * | 7/2012 | Huggins et al. ............... | 315/159 |

* cited by examiner

*Primary Examiner* — Brian Ngo
(74) *Attorney, Agent, or Firm* — William Park & Associates Ltd.

(57) ABSTRACT

A battery pack includes: a cell module including a plurality of battery cells; and a coil unit installed on one side of the cell module and having coils stacked therein, the coils being connected to the respective battery cells.

4 Claims, 2 Drawing Sheets

BATTERY PACK, BATTERY APPARATUS INCLUDING THE SAME, AND CELL BALANCING METHOD THEREOF

CROSS-REFERENCES TO RELATED APPLICATION

The present application claims priority under 35 U.S.C. §119(a) to Korean application number 10-2012-0093183, filed on Aug. 24, 2012, in the Korean Intellectual Property Office, which is incorporated herein by reference in its entirety.

BACKGROUND

1. Technical Field

The present invention relates to an energy storing apparatus, and more particularly, to a battery pack, a battery apparatus including the same, and a cell balancing method thereof.

2. Related Art

Starting from a hybrid electric vehicle (HEV), an electric vehicle (EV) has developed to a plug-in hybrid electric vehicle (PHEV). Furthermore, the development and management of a battery serving as a power source is one of main concerns of the EV market, and many battery makers are devoting all their strength to preoccupy new techniques.

Recently, much attention has been paid to a smart grid which is an intelligent electric power network system in which a supplier and a consumer interact with each other through information communication technology combined with production, transport, and consumption processes for electricity, thereby increasing efficiency.

The EV or smart grid uses a large-capacity energy storing apparatus, and a battery pack obtained by connecting a plurality of cells, for example, 10 to 1,000 cells is used as a power source. Since a large-capacity battery includes a plurality of cells, an imbalance of state of charge (SOC) may occur between the cells, due to characteristic and temperature differences between the cells. The imbalance of SOC has a bad effect on the entire battery performance. In order to solve such a problem, power needs to be transmitted from a cell having a high SOC and a cell having a low SOC. Such a power transmission method is referred to as active cell balancing.

The cell balancing method which is currently used is based on a wired method. That is, power is transmitted from one cell to another cell through a wire by a switch controlled by a battery controller. In the wired cell balancing method, however, when the number of cells increases to several tens or more, the connection between the wire and the switch becomes very complex. Furthermore, since a large number of manual operations are required during a manufacturing process, the manufacturing cost increases.

Therefore, more advanced technology is urgently required for a cell balancing operation of a large-capacity battery apparatus.

SUMMARY

In one embodiment of the present invention, a battery pack includes: a cell module including a plurality of battery cells; and a coil unit installed on one side of the cell module and having coils stacked therein, the coils being connected to the respective battery cells.

In another embodiment of the present invention, a battery apparatus includes: a cell module including a plurality of battery cells; a coil unit installed on one side of the cell module and having coils stacked therein, the coils being connected to the respective battery cells; and a BMS configured to select a transmitting cell and one or more receiving cells based on states of charge (SOC) of the respective cells, and form an induced current between a coil connected to the transmitting cell and coils connected to the one or more receiving cells.

In another embodiment of the present invention, there is provided a cell balancing method of a battery apparatus which includes a cell module including a plurality of battery cells, a coil unit installed on one side of the cell module and having coils stacked therein, the coils being connected to the respective battery cells, and a BMS connected to one side of the coil. The cell balancing method includes the steps of: measuring, by the BMS, SOC of the respective cells included in the cell module; determining, by the BMS, a transmitting cell and one or more receiving cells based on the SOC measurement results; and forming, by the BMS, a current path such that a coil connected to the transmitting cell and coils connected to the one or more receiving cells cause magnetic induction.

BRIEF DESCRIPTION OF THE DRAWINGS

Features, aspects, and embodiments are described in conjunction with the attached drawings, in which.

DETAILED DESCRIPTION

Hereinafter, a battery pack, a battery apparatus including the same, and a cell balancing method according to the present invention will be described below with reference to the accompanying drawings through exemplary embodiments.

Figure 1:
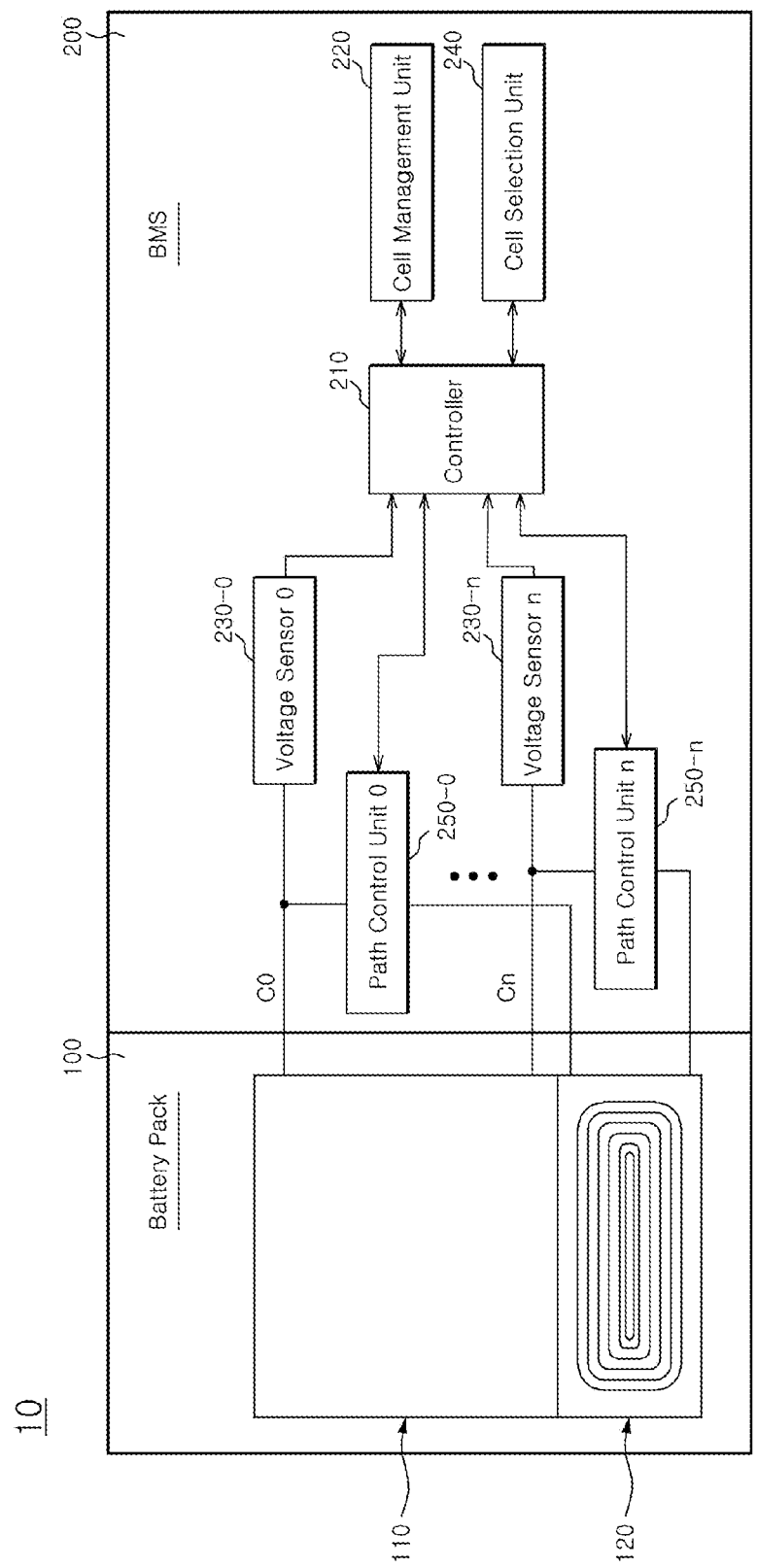
FIG. 1 is a configuration diagram of a battery apparatus according to one embodiment of the present invention.

FIG. 1 is a configuration diagram of a battery apparatus according to one embodiment of the present invention.

Referring to FIG. 1, the battery apparatus 10 according to the embodiment of the present invention may include a battery pack 100 and a battery management system (BMS) 200.

The battery pack 100 includes a cell module 110 and a coil unit 120. The cell module 110 includes a plurality of battery cells arranged therein, and the coil unit 120 includes a plurality of coils connected to the respective cells.

Each of the cells has a case formed of a metal such as aluminum or a material such as synthetic resin. Furthermore, the exterior of the cell has a rectangular parallelepiped shape such as a box shape, and the plurality of cells are erected and installed at a predetermined distance from each other so as to operate as a large-capacity energy storing apparatus. Each of the cells may include a lithium-on battery, for example, but is not limited thereto.

The coil unit 120 may be installed on one surface of the cell module 110, or desirably, on the bottom surface of the cell module 110. The coils connected to the respective cells may be stacked one upon another. That is, as the coils are connected to the respective cells, it is possible to perform wireless power transmission through magnetic induction. In order to perform wireless power transmission according to the magnetic induction method, the distance between the coils may be set to several cm or less. Therefore, in order to install the coils close to each other, the coil unit 120 having the coils stacked therein may be installed on any one surface of the cell module 110 so as to increase the power transmission efficiency.

The BMS 200 includes a controller 210, a cell management unit 220, voltage sensors 230-0 to 230-$n$, a cell selection unit 240, and path control units 250-0 to 250-$n$.

Basically, the BMS 200 monitors the state of a battery, and prevents overcharge and overdischarge of the battery such that the battery may be maintained and used under an optimal condition. Furthermore, the BMS 200 performs an energy storage input/output function, a power control function, a cell balancing function and the like such that the battery apparatus 10 is automatically managed. Furthermore, the BMS 200 may estimate a replacement time of the battery and previously discover a battery having a problem. FIG. 1 selectively illustrates only components required for cell balancing.

The cell balancing may be performed during a rest period in which the battery apparatus is neither charged nor discharged.

More specifically, the cell management unit 220 is configured to store and manage the IDs of the respective cells included in the cell module 110. The voltage sensors 230-0 to 230-$n$ are configured to measure the SOC of the respective cells and provide the measured SOC to the controller 210.

The controller 210 is configured to determine whether cell balancing is required or not, according to the SOC received from the voltage sensors 230-0 to 230-$n$. Furthermore, the cell selection unit 240 is configured to select any one transmitting cell and one or more receiving cell based on the SOC of the respective cells.

Here, the transmitting cell may include a cell of which the SOC is the highest. Furthermore, the one or more receiving cells may include a predetermined number of cells from a cell of which the SOC is the lowest.

As the transmitting and receiving cells are selected by the cell selection unit 240, the path control units 250-0 to 250-$n$ are switched by the controller 210 so as to form a current path for causing magnetic induction between the transmitting and receiving cells. Accordingly, a coil connected to the transmitting cell operates as a primary coil and a coil connected to the receiving cell operates a secondary coil such that SOC balancing between the cells is performed.

Figure 2:
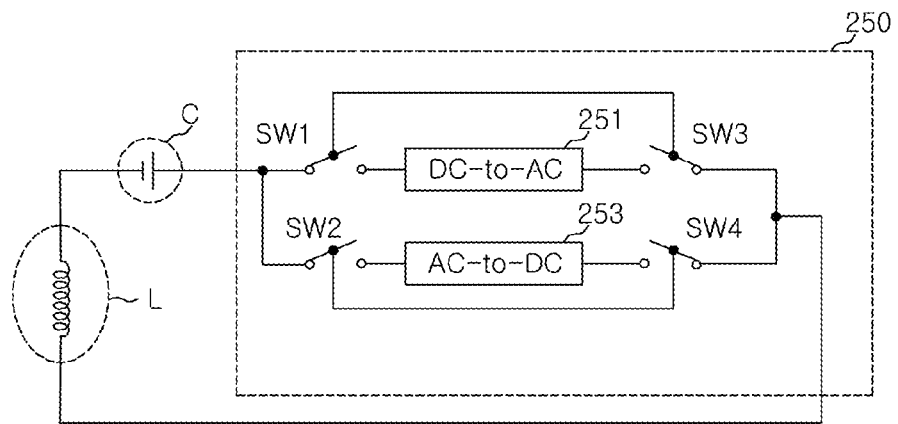
FIG. 2 is a diagram for explaining the configuration of a path control unit of FIG. 1 and a cell balancing concept using the path control unit.

FIG. 2 is a diagram for explaining the configuration of the path control unit of FIG. 1 and the cell balancing concept using the path control unit.

First, the path control unit 250 includes a first switch SW1, a DC-to-AC converter 251, a third switch SW3, a second switch SW2, an AC-to-DC converter 253, and a fourth switch SW4. The first switch SW1 is connected to a first electrode (for example, cathode) of a cell C. The DC-to-AC converter 251 is connected to the first switch SW1. The third switch SW3 is connected to the DC-to-AC converter 251 and turned on/off in connection with the first switch SW1. The second switch SW2 is connected to the first electrode of the cell C in parallel to the first switch SW1. The AC-to-DC converter 253 is connected to the second switch SW2. The fourth switch SW4 is connected to the AC-to-DC converter 253 and turned on/off in connection with the second switch SW2. Furthermore, one ends of the third and fourth switches SW3 and SW4 are commonly connected.

Meanwhile, a coil L may be configured in such a manner that one end thereof is connected to a second electrode (for example, anode) of the cell C and the other end thereof is connected to the common connection terminal of the third and fourth switches SW3 and SW4.

Each of the cells basically uses DC power. Therefore, in the case of the transmitting cell to transmit power, the first and third switches SW1 and SW3 transit to an on state, in order to convert DC power to AC power. Furthermore, since the receiving power to receive power must convert the AC current received through the coil L into the DC current, the second and fourth switches SW2 and SW4 transit to an on state.

Therefore, when any one cell is selected as the transmitting cell, the first and third switches SW1 and SW3 transit to an on state, electric charges discharged from the transmitting cell are converted into AC current by the DC-to-AC converter 251, and an induced current is formed in the coil. Furthermore, in the path control unit connected to a cell selected as the receiving cell, the second and fourth switches SW2 and SW4 transit to an on state, and the induced current of the coil connected to the transmitting cell is induced into the coil connected to the receiving cell. Then, the induced current is converted into DC power by the AC-to-DC converter 253 to charge the receiving cell.

Figure 3:
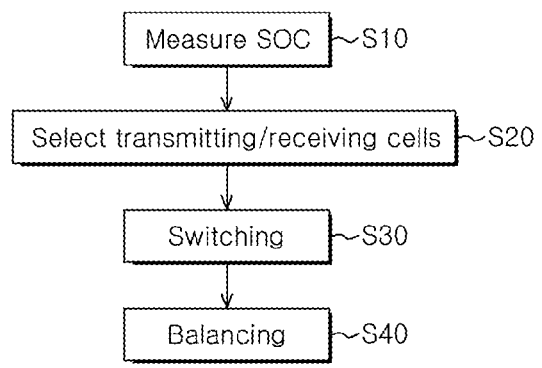
FIG. 3 is a flowchart for explaining a cell balancing method according to another embodiment of the present invention.

FIG. 3 is a flowchart for explaining a cell balancing method according to another embodiment of the present invention.

First, the voltage sensors 230-0 to 230-$n$ of the BMS 200 measure the SOC of the respective cells included in the cell module 110 according to the control of the controller 210 at step S10. The controller 210 provides the measurement results of the voltage sensors 230-0 to 230-$n$ to the cell selection unit 240, and the cell selection unit 240 determines one transmitting cell and one or more receiving cells at step S20. Here, the transmitting cell may be selected as a cell of which the SOC is the highest, and the receiving cells may be selected as a designated number of cells from a cell of which the SOC is the lowest.

Then, the controller 210 forms a current path by controlling the switches SW1 to SW4 provided in the path control units of the transmitting cell and the receiving cells selected by the cell selection unit 240, at step S30.

Accordingly, the coil of the transmitting cell operates as a primary coil and the coil of the receiving cell operates as a secondary cell such that cell balancing is performed, at step S40.

In the existing wired cell balancing method, power may be transmitted from one cell only to another cell through the switch structure. In the wireless cell balancing method according to the embodiment of the present invention, however, power may be transmitted from one cell to a plurality of cells.

In the cell balancing method according to the embodiment of the present invention, the coils are arranged close to each other. Therefore, the cell balancing method may have very high transmitting efficiency through magnetic induction. Furthermore, since power may be simultaneously transmitted from one cell of which the SOC is high to a plurality of cells of which the SOC is low, the cell balancing time may be reduced.

In a way, the embodiment of the present invention may correspond to a combination of wired and wireless power transmission methods. However, compared to the wired power transmission method, the cell balancing method according to the embodiment of the present invention does not require a complex switch network to connect a cell to cells. Furthermore, only a minimum number of switches for causing magnetic induction between coils are required.

Furthermore, when a new cell is to be installed, only one layer of coils may be added to an existing battery. Therefore, scalability is improved, for example, various sizes of batteries may be easily manufactured.

While certain embodiments have been described above, it will be understood to those skilled in the art that the embodiments described are by way of example only. Accordingly, the battery apparatus described herein should not be limited based on the described embodiments. Rather, the battery apparatus described herein should only be limited in light of the claims that follow when taken in conjunction with the above description and accompanying drawings.

What is claimed is:

1. A battery apparatus comprising:
a cell module comprising a plurality of battery cells;
a coil unit installed on one side of the cell module and having coils stacked therein, the coils being connected to the respective battery cells; and
a battery management system (BMS) configured to select a transmitting cell and one or more receiving cells based on states of charge (SOC) of the respective cells, and form an induced current in a coil connected to the transmitting cell by converting electric charges discharged from the transmitting cell into AC current, and converting the induced current induced into one or more coils connected to the one or more receiving cells into DC power,
wherein the BMS comprises a cell management unit configured to manage IDs of the respective cells;
a voltage sensor configured to measure the SOC of each of the battery cells;
a cell selection unit configured to select a transmitting cell and one or more receiving cells based on the measurement result of the voltage sensor, when cell balancing is required; and
a path control unit connected between each battery cell and a coil connected to the battery cell, and configured to form a current path such that the coil connected to the transmitting cell and the coils connected to the one or more receiving cells cause magnetic induction therebetween,
wherein the path control unit comprises a first switch connected to a first electrode of a battery cell;
a DC-to-AC converter connected to the first switch;
a third switch connected to the DC-to-AC converter and turned on or off in connection with the first switch;
a second switch connected to the first electrode of the battery cell in parallel to the first switch;
an AC-to-DC converter connected to the second switch; and
a fourth switch connected to the AC-to-DC converter, turned on or off in connection with the second switch, and having one end connected to one end of the third switch.

2. The battery apparatus according to claim 1, wherein the cell selection unit selects a cell having the highest SOC as the transmitting cell.

3. The battery apparatus according to claim 1, wherein the cell selection unit selects the receiving cells by a designated number of receiving cells from a cell having the lowest SOC.

4. The battery apparatus according to claim 1, wherein a coil connected to the battery cell has one side connected to a second electrode of the battery cell and the other side connected to a common connection terminal of the third and fourth switches.

* * * * *